United States Patent
Shimoyama (12)

(10) Patent No.: US 6,710,897 B1
(45) Date of Patent: Mar. 23, 2004

(54) FACSIMILE DEVICE APPLYING ONE-TOUCH DIALING OPERATION FOR EFFECTING AUTOMATIC TRANSMISSION BY PRE-REGISTERED DESTINATION FACSIMILE NUMBERS

(75) Inventor: Atsushi Shimoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/310,575

(22) Filed: May 12, 1999

(30) Foreign Application Priority Data

May 14, 1998 (JP) ............................................. 10-132225

(51) Int. Cl.⁷ .................................................. H04N 1/00
(52) U.S. Cl. ...................................... 358/440; 358/468
(58) Field of Search .................................. 358/440, 402, 358/468, 444, 434, 403, 407; 379/100.04, 100.17

(56) References Cited

U.S. PATENT DOCUMENTS 4,754,335 A * 6/1988 Izawa et al. ................. 358/440
4,764,951 A * 8/1988 Kotani et al.

(List continued on next page.)

FOREIGN PATENT DOCUMENTS

| GB | 2337660 | * 11/1999 | ............ H04N/1/32 |
|---|---|---|---|
| JP | 62-249561 A | 10/1987 | |
| JP | 62-249561 | * 10/1987 | |
| JP | 63-83866 | * 4/1988 | |
| JP | 62-261275 | * 6/1988 | |
| JP | 63-220662 | 9/1988 | |
| JP | 63-250270 | * 10/1988 | |
| JP | 64-12673 | * 1/1989 | |
| JP | 1-149650 | * 6/1989 | |
| JP | 1-149650 A | 6/1989 | |

(List continued on next page.)

Primary Examiner—Mark Wallerson
(74) Attorney, Agent, or Firm—Foley & Lardner

(57) ABSTRACT

A facsimile device comprising a back-up memory for storing a plurality of destination facsimile numbers each of which corresponds to a certain one-touch key provided on the device, a modem section for transmitting and receiving in accordance with a facsimile communication procedure, a communication control section for closing the subscriber telephone line when starting facsimile communication and opening the subscriber telephone line when terminating the facsimile communication, a facsimile transceiver section for transferring image information for transmission to the modem section, and for printing and outputting image information received from the modem section, and a main control section for controlling the modem section, the communication control section, and the facsimile transceiver section such that in response to a certain key being pressed, it dials a plurality of facsimile numbers of a designated destination, one at a time, in turn, so that an available destination facsimile number of a facsimile communication means of the designated destination is automatically selected, whereby facsimile communication directed to the designated destination is effected.

19 Claims, 3 Drawing Sheets

U.S. PATENT DOCUMENTS

| | | | | |
|---|---|---|---|---|
| 4,800,582 A | * | 1/1989 | D'Agosto et al. | 379/216.01 |
| 4,811,111 A | * | 3/1989 | Kurokawa | |
| 4,908,853 A | * | 3/1990 | Matsumoto | |
| 4,920,560 A | * | 4/1990 | Kageyama | |
| 5,189,527 A | * | 2/1993 | Matsuda et al. | 358/440 |
| 5,208,683 A | * | 5/1993 | Okada | |
| 5,216,705 A | * | 6/1993 | Yoshida et al. | 379/100.14 |
| 5,293,256 A | * | 3/1994 | Fukushima et al. | 358/468 |
| 5,293,385 A | * | 3/1994 | Hary | 714/38 |
| 5,428,676 A | * | 6/1995 | Ogawa | |
| 5,509,067 A | * | 4/1996 | Murata | |
| 5,568,546 A | * | 10/1996 | Marutiak | |
| 5,590,190 A | * | 12/1996 | Kageyama | |
| 5,592,546 A | * | 1/1997 | Takahashi | |
| 5,661,568 A | * | 8/1997 | Ueno | |
| 5,668,864 A | * | 9/1997 | Kageyama | |
| 5,721,766 A | * | 2/1998 | Yoshino et al. | |
| 5,745,257 A | * | 4/1998 | Kato et al. | |
| 5,798,845 A | * | 8/1998 | Baek et al. | |
| 5,963,623 A | * | 10/1999 | Kim | 379/100.01 |
| 6,195,428 B1 | * | 2/2001 | Maruyama | |
| 6,298,131 B1 | * | 10/2001 | Veschi | |
| 2002/0087764 A1 | * | 7/2002 | Yokoyama | 710/104 |

FOREIGN PATENT DOCUMENTS

| | | | | | |
|---|---|---|---|---|---|
| JP | 1-221968 | * | 9/1989 | | |
| JP | 3-24862 | * | 2/1991 | | |
| JP | 3-24862 A | | 2/1991 | | |
| JP | 3-44253 A | | 2/1991 | | |
| JP | 3-44253 | * | 2/1991 | | |
| JP | 4-247762 A | | 9/1992 | | |
| JP | 4-247762 | * | 9/1992 | | |
| JP | 5-37761 A | | 2/1993 | | |
| JP | 5-37761 | * | 2/1993 | | |
| JP | 5-284323 | * | 10/1993 | | |
| JP | 5-316252 | | 11/1993 | | |
| JP | 6-37879 | * | 2/1994 | | |
| JP | 6-37879 A | | 2/1994 | | |
| JP | 6-121144 | * | 4/1994 | | |
| JP | 6-334722 A | | 12/1994 | | |
| JP | 6-334722 | * | 12/1994 | | |
| JP | 7-107260 | | 4/1995 | | |
| JP | 7-143310 | * | 6/1995 | | |
| JP | 407321997 | * | 12/1995 | | H04N/1/00 |
| JP | 8-9125 | * | 1/1996 | | |
| JP | 409163062 | * | 6/1997 | | H04N/1/00 |
| JP | 409181897 | * | 7/1997 | | H04N/1/32 |
| JP | 9-247303 | * | 9/1997 | | |

* cited by examiner

F I G. 2
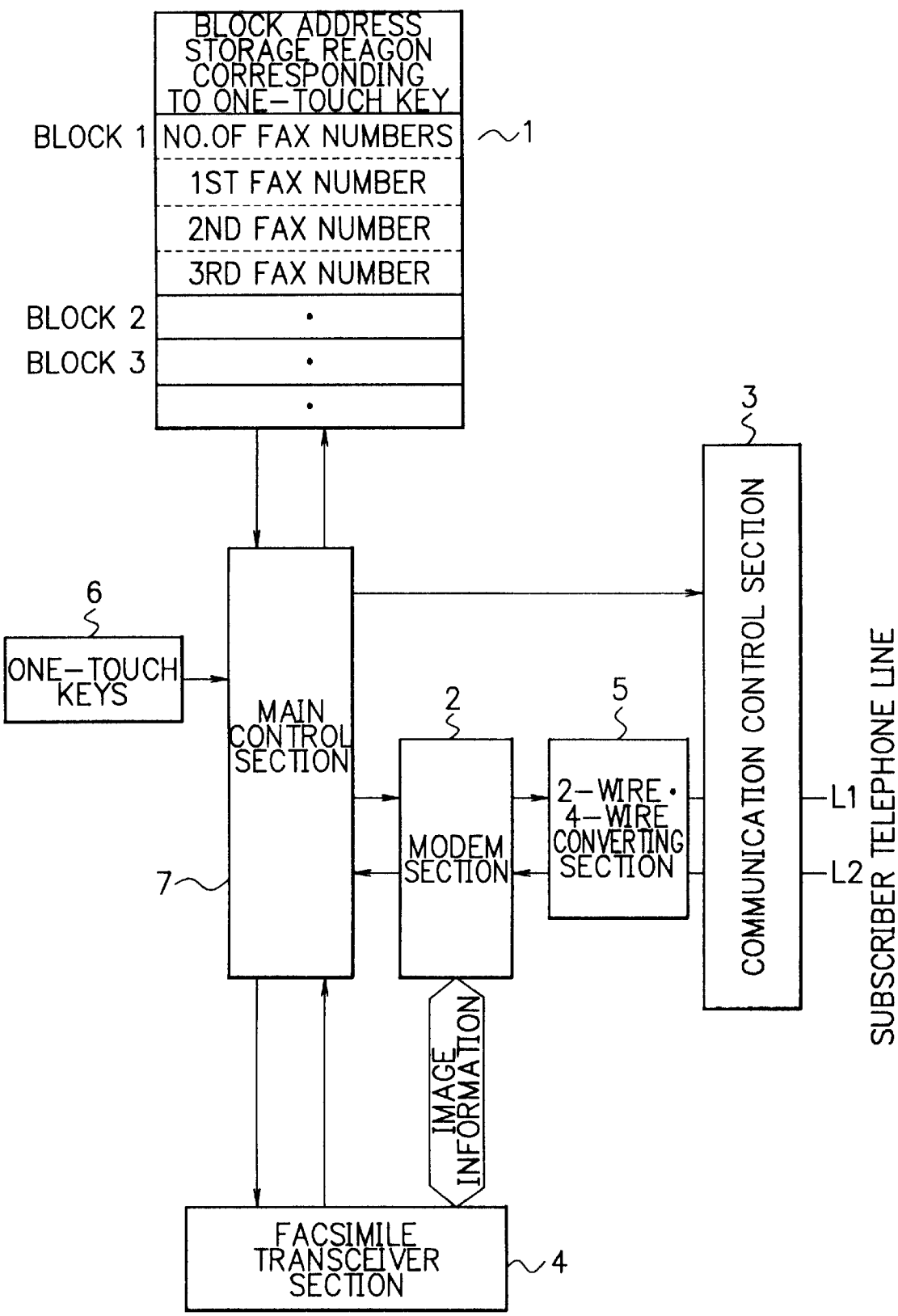

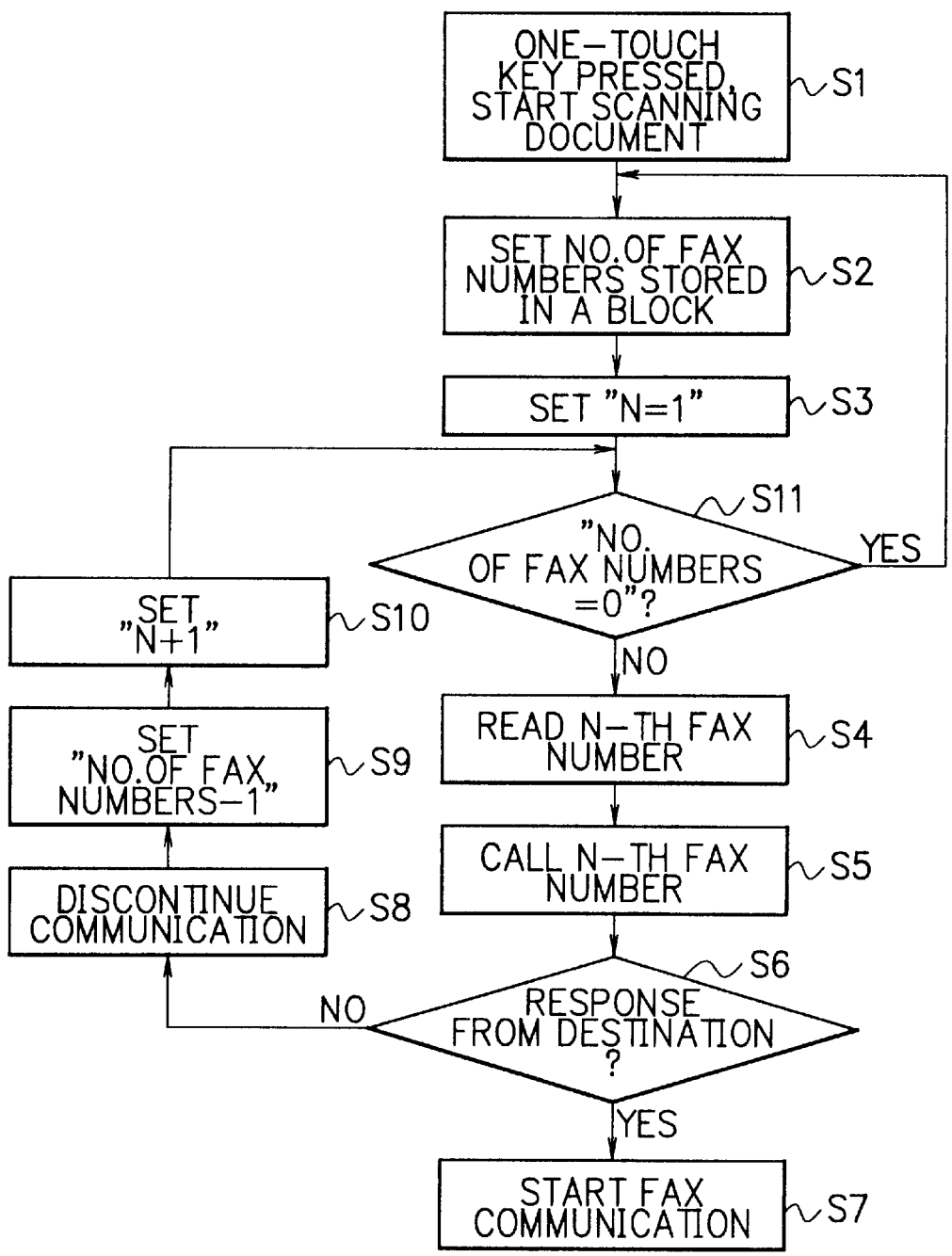

FACSIMILE DEVICE APPLYING ONE-TOUCH DIALING OPERATION FOR EFFECTING AUTOMATIC TRANSMISSION BY PRE-REGISTERED DESTINATION FACSIMILE NUMBERS

BACKGROUND OF THE INVENTION

The present invention relates to a facsimile device, and in particular to a facsimile device applying one-touch dialing operation for effecting automatic transmission by pre-registered destination facsimile numbers.

DESCRIPTION OF THE RELATED ART

Some conventional facsimile devices such as the one disclosed in Japanese Patent Laid-Open Publication No. 63-220662 are capable of automatic transmission directed to a desired destination by a one-touch dialing operation. In those conventional facsimile devices, the one-touch dialing operation is based on pre-registering of a plurality of destination facsimile numbers, each of which corresponds to a certain numerical operation key on the device. Owing to such one-touch dialing operation system, transmitting operation is simplified, and therefore facsimile transmissions can be done effectively, especially in case where frequent transmissions are required.

In a typical system where one-touch dialing operation is executed by operation keys of one-digit numbers, a single facsimile device can register up to 10 destinations for automatic transmission, but no more than that. Therefore, when a number of users are sharing one such facsimile device, only a few destination registrations are allowed to each user, which is inconvenient.

On the other hand, in accordance with the conventional facsimile device as disclosed in the above-mentioned Japanese Patent Laid-Open Publication No. 63-220662, in registering a certain destination, a user identification number provided for each user is inputted along with a one-digit dial number before entering the desired destination facsimile number for registration. In registering other destinations, the same procedure is repeated. In this manner, each user can register up to 10 different destinations by assigning the one-touch dial numbers thereto, respectively. Therefore, within a single facsimile device, the number of destinations for registration to which the user can effect automatic transmission by one-touch dialing can be increased.

FIG. 1 is a diagram showing structures of destination facsimile number registration management tables in a conventional facsimile device.

In FIG. 1, TB00–TB99 are shown as management tables corresponding to 100 users, respectively. Each management table among tables TB00–TB99 corresponds to an identification number of a particular user, within a counter (unshown). Further, in each management table, 0–9 indicate one-touch dial numbers, each of which corresponds to a destination facsimile number which is being pre-registered.

As the user inputs his/her identification number, a corresponding management table is selected. Then as the user enters a certain one-touch dial number, a corresponding destination facsimile number in the selected management table is outputted. Thus, automatic transmission directed to a desired destination can be executed.

In accordance with the above-described conventional facsimile device, however, automatic transmission by a one-touch dialing operation is limited to one pre-registered facsimile number at a time. Therefore, even when the transmission destination at the other end of the line has facsimile communication means responsive to a plurality of facsimile numbers, automatic transmission to the destination is not possible by other facsimile numbers besides the one being pre-registered and designated through the dial operation.

That is, in the conventional facsimile device, transmission by a one-touch dialing operation is only possible with respect to one destination facsimile number. When the line is busy at this facsimile number, the user facsimile device uses a re-dialing system and re-dials the same destination facsimile number after a predetermined period of time. If the line is still busy at this time, then the same procedure is repeated for several times until the line is disconnected.

Under such conditions, even when the designated destination at the other end of the line has facsimile communication means responsive to a plurality of facsimile numbers, the user can only select one facsimile number in a single one-touch dialing communication. Therefore, even when the destination has other available facsimile numbers, the user facsimile device is not capable of transmission using other facsimile numbers but the one corresponding to the initially designated one-touch dial number.

On the other hand, if it is possible to effect facsimile communication by automatically selecting other available facsimile numbers of the designated destination, then even when the line is busy at the initially dialed facsimile number, faster facsimile transmission can be effected without having to wait for connection after re-dialing or without any compulsory disconnection due to expiration of time. Thus, a facsimile device applying such system would be extremely convenient although no such system has been proposed in the past.

SUMMARY OF THE INVENTION

It is therefore an object of the present invention to solve the above-mentioned problems, and to provide a facsimile device which is capable of executing effective facsimile transmission directed to a desired destination having facsimile transmission means responsive to a plurality of facsimile numbers. The present invention intends to achieve such object by automatically selecting an available destination facsimile number among a plurality of destination facsimile numbers to conduct facsimile transmission, in response to selecting and transmitting of one corresponding one-touch dial number.

In order to serve such purpose, in accordance with a first aspect of the present invention, there is provided a facsimile device comprising a registration means, a modem means, a facsimile transceiver means, a communication control means, and a main control means. The registration means serves to store a plurality of destination facsimile numbers, each of which corresponds to a certain key among other arbitrary number of keys. The modem means serves to transmit and receive facsimile signals between a remote device in accordance with a facsimile communication procedure. The facsimile transceiver means serves to scan loaded documents to transfer the scanned image information to the modem means, and to print out and output image information which is being transferred from the modem means. The communication control means serves to control closing and opening of a subscriber telephone line. The main control means serves to control the registration means to register thereto and read-out therefrom the destination facsimile numbers. The main control means further serves to perform control operations over the modem means, the communication control means, and the facsimile transceiver means, such that in response to a certain key being pressed at a time of facsimile communication, calling operation directed to a particular destination designated by the pressed key is executed by dialing a plurality of destination facsimile numbers, one at a time, in turn, so that an available destination facsimile number of a facsimile communication means of the designated destination is automatically selected, whereby facsimile communication directed to the designated destination is effected by the selected destination facsimile number.

In accordance with a second aspect of the present invention, there is provided a facsimile device relevant to the facsimile device in the first aspect, wherein the registration means includes regions for storing addresses of blocks, each of which corresponds to a certain key. The registration means is constructed in such a way that each of said regions stores a value indicating a number of registered facsimile numbers of a particular destination corresponding to a certain key, and the registered facsimile numbers themselves.

In accordance with a third aspect of the present invention, there is provided a facsimile device relevant to the facsimile device in the first aspect or the second aspect, wherein the modem means is constructed in such a way that at a time of facsimile communication, it serves to execute transmission and reception of control signals between a remote device in accordance with a regulated facsimile communication procedure; detect busy tone signals indicating that the line is busy at a certain destination facsimile number; transmit facsimile image information signals to the destination; and receive facsimile image information signals from a remote device.

In accordance with a fourth aspect of the present invention, there is provided a facsimile device relevant to the facsimile device in any one of the first to third aspects, wherein the facsimile transceiver means effects bidirectional parallel data transmission between the modem means by digital data, such that at a time of facsimile transmission, image information obtained by scanning the loaded documents is transferred to the modem means; and at a time of facsimile reception, image information is received from the modem means so that it is printed and outputted.

In accordance with a fifth aspect of the present invention, there is provided a facsimile device relevant to the facsimile device in any one of the first to fourth aspects, wherein the main control means is constructed in such a way that at a time of one-touch key registration, it controls the registration means to determine a location for a block corresponding to each key in order to store an address of each block in a designated region, and to store in each block a value indicating the number of the registered destination facsimile numbers as well as the registered destination facsimile numbers themselves of a particular destination; while at a time of one of the keys being pressed, it controls the facsimile transceiver means to immediately start scanning loaded documents so as to store the scanned image information, controls the registration means to read out registered destination facsimile numbers in a block designated by the pressed key in turn while also counting them, controls the modem means to call the designated destination by the registered destination facsimile numbers being read out, and controls the communication control means to close the subscriber telephone line and let the image information be transmitted from the facsimile transceiver means; and while at a time of terminating the facsimile communication or detecting busy tone signals from the modem means, it gives instruction to the communication control means to open the subscriber telephone line.

In accordance with a sixth aspect of the present invention, there is provided a facsimile device relevant to the facsimile device in any one of the first to fifth aspects, wherein the keys are provided in such a way that upon any one of them being pressed, corresponding information is transmitted to the control means.

On the basis of the structure of the present invention, the registration means serves to store a plurality of destination facsimile numbers, each of which corresponds to a certain key among other arbitrary number of keys; the modem means serves to transmit and receive facsimile signals between a remote device in accordance with a facsimile communication procedure; the facsimile transceiver means serves to scan loaded documents to transfer the scanned image information to the modem means, and to print out and output image information which is being transferred from the modem means; the communication control means serves to control closing and opening of a subscriber telephone line; and the main control means serves to control the registration means to register thereto and read-out therefrom the destination facsimile numbers, the main control means further serving to perform control operations over the modem means, the communication control means, and the facsimile transceiver means, such that in response to a certain key being pressed at a time of facsimile communication, calling operation directed to a particular destination designated by the pressed key is executed by dialing a plurality of destination facsimile numbers, one at a time, in turn, so that an available destination facsimile number of a facsimile communication means of the designated destination is automatically selected, whereby facsimile communication directed to the designated destination is effected by the selected destination facsimile number.

Accordingly, in attempting facsimile communication directed to a certain pre-registered destination responsive to a plurality of facsimile numbers, the facsimile device of the present invention is capable of analyzing the availability of line at each destination facsimile number by calling up the destination facsimile numbers, one at a time, in turn. Then on finding an available facsimile number, the facsimile communication is carried out through this number. Therefore, the present invention is capable of effectively transmitting facsimile documents directed to a designated destination, especially when the designated destination has facsimile communication means responsive to a plurality of facsimile numbers.

BRIEF DESCRIPTION OF THE DRAWINGS

The above and further objects and the novel feature of the invention will more fully appear from the following detailed description when the same is read in connection with the accompanying drawings, in which:

FIG. 2 is a block diagram showing an electric structure of a facsimile device of one embodiment of the invention; and FIG. 3 is a flow chart explaining an operation of the facsimile device of the embodiment of the invention.

DESCRIPTION OF THE PREFERRED EMBODIMENT

Figure 1:
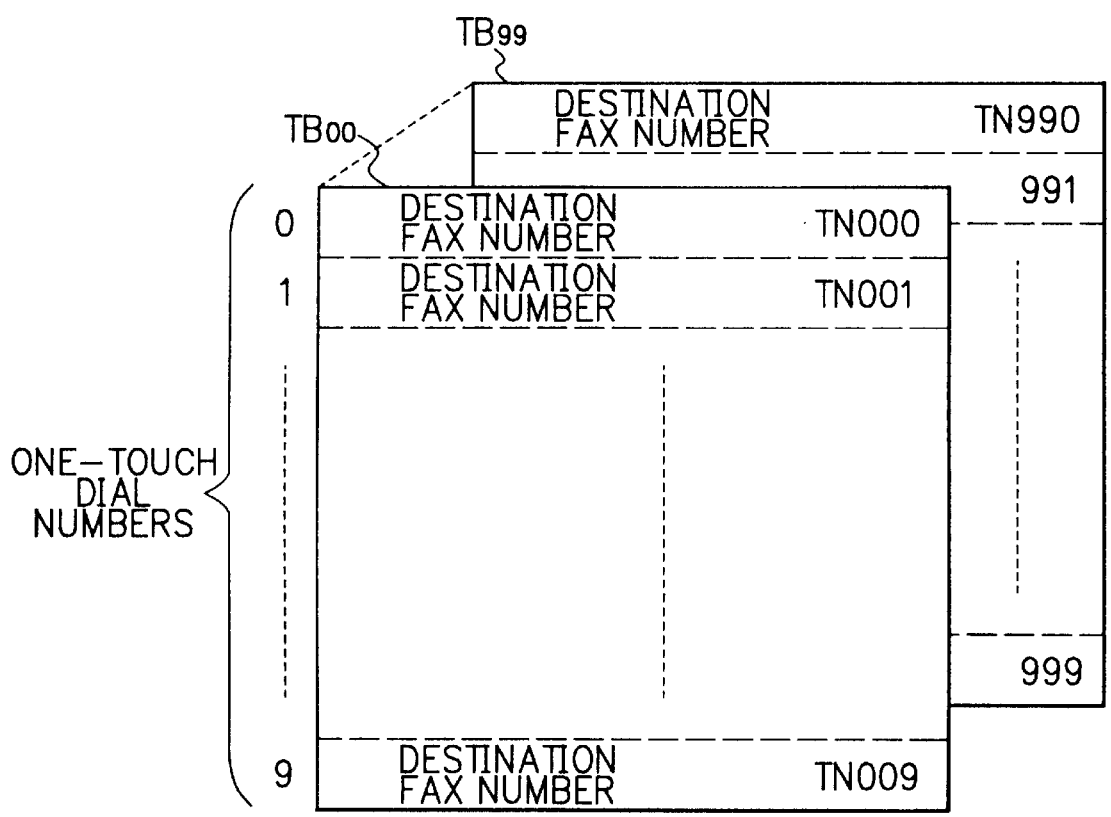
FIG. 1 is a diagram showing structures of destination facsimile number registration management tables in a conventional facsimile device.

Referring now to the drawings, a description of a preferred embodiment of the present invention will be given in detail.

FIG. 2 is a block diagram showing an electric structure of a facsimile device of one embodiment of the present invention. In rough outline, the facsimile device of the present embodiment comprises a back-up memory 1, a modem section 2, a communication control section 3, a facsimile transceiver section 4, a two-wire·four-wire converting section 5, one-touch keys 6, and a main control section 7.

The back-up memory 1 contains a plurality of blocks, each of which corresponds to a one-touch key of the one-touch dialing function. Each block stores a value representing the number of registered facsimile numbers and the registered facsimile numbers themselves of a particular destination. Further, a storage location of each block corresponding to a certain one-touch key is in a block address storage region in the back-up memory 1 corresponding to the one-touch key. By reading out this storage region, it is possible to know the storage location of a certain block containing facsimile number information of a particular destination.

During facsimile communication, the modem section 2 is in charge of transmitting and receiving signals between the remote station, in accordance with a facsimile procedure based on predetermined rules for facsimile transmission. At the same time, the modem section 2 is also in charge of transmitting facsimile image information signals toward the destination station, as well as receiving facsimile image information signals from the remote station.

In conducting facsimile transmission, the communication control section 3 controls to close the subscriber telephone line. At the same time, the communication control section 3 controls connecting and opening between the subscriber telephone line and the modem section 2.

The facsimile transceiver section 4 has a scanner for scanning documents, a file memory for storing image information, and a printer for printing out image information. At a time of facsimile transmission, the facsimile transceiver section 4 is to transfer the stored image information which has been obtained by scanning the documents, to the modem section 2. At a time of facsimile reception, the facsimile transceiver section 4 is to receive image information from the modem section 2, store the received image information, and then print out the information for output. Transmission of image information between the facsimile transceiver section 4 and the modem section 2 is executed by a bidirectional parallel data transmission by digital data.

Further, the two-wire·four-wire converting section 5 executes mutual conversion of four-wire transceiver information between the modem section 2 and two-wire transceiver information between the communication control section 3.

The one-touch keys 6 are provided in voluntary number. On pressing one of the keys, information of corresponding one-touch key number is transmitted to the main control section 7.

The main control section 7 comprises a central processing unit (CPU), a program memory, and an arithmetic memory.

In the operation in connection with the back-up memory 1, the main control section 7 determines the location of a block corresponding to each key at a time of one-touch key registration. Then the main control section 7 stores the address of each block to the block address storage region corresponding to the one-touch key. Next, the main control section 7 is to set to the back-up memory 1, a value representing the number of registered destination facsimile numbers, as well as the registered destination facsimile numbers themselves, which are being designated to the corresponding block.

When one of the one-touch keys 6 is pressed, the main control section 7 immediately operates on the facsimile transceiver section 4 to let it scan loaded documents and store the information being scanned. After that, the main control section 7 is to operate on the back-up memory 1 to count the number of the destination facsimile numbers in the block designated by the one-touch key 6, and to read out the stored destination facsimile numbers in turn.

In the operation in connection with the modem section 2, the main control section 7 instructs the modem section 2 to call the destination facsimile number being read out from the back up memory 1, and to conduct facsimile communication. When the line is busy at the attempted facsimile number, the main control section 7 will receive a notification from the modem section 2 indicating a detection of busy tone.

In the operation in connection with the communication control section 3, the main control section 7 is to instruct the communication control section 3 to close the subscriber telephone line in starting the facsimile communication. In terminating the facsimile communication, or in receiving a notification of busy tone detection from the modem section 2, the main control section 7 is to instruct the communication control section 3 to open the subscriber telephone line.

Next, the operation of the facsimile device in the present embodiment will be explained with reference to FIG. 2 and FIG. 3.

In starting facsimile communication using the one-touch dialing function, in response to a certain one-touch key 6 being pressed, corresponding one-touch key information is transmitted to the main control section 7. As the main control section 7 confirms that a certain one-touch key 6 is pressed, it immediately operates on the facsimile transceiver section 4 to start scanning loaded documents and storing the scanned information (step S1). At the same time, the main control section 7 searches for the address of a block corresponding to the designated one-touch key among the block address storage regions corresponding to the one-touch keys. Then the main control section 7 confirms the number of the registered destination facsimile numbers in that particular block, so as to set the confirmed number in a first register (not shown in the figure) which is provided inside the main control section 7 (step S2). The main control section 7 then sets "N=1" in a second register, which is also not shown in the figure (step S3). Here, the second register serves to confirm the order of the facsimile number relevant to a particular destination, to which access is to be made. Therefore, "N=1" indicates the first facsimile number, to which an attempt to connection is to be made.

Next, the main control section 7 is to read out the first facsimile number of the particular destination from the corresponding block (step S4). The main control section 7 then pass out the first facsimile number to the modem section 2 so as to let the modem section 2 carry out the calling operation (step S5). At the same time, the main control section 7 commands the communication control section 3 to close the subscriber telephone line so as to secure a communication route. As the modem section 2 confirms a response from the designated destination as a result of calling by the first facsimile number (step S6), facsimile transmission is executed, as the stored image information is transmitted to the designated destination from the facsimile transceiver section 4 through the modem section 2 in accordance with the control by the main control section 7 (step S7).

In case when the line is busy at the first facsimile number of the designated destination, the modem section 2 detects busy tone signals from the destination station indicating that the first facsimile number is being used at the moment. Then the modem section 2 notifies the main control section 7 that the first facsimile number is not available (step S6). In receiving such notification indicating that the destination facsimile number is being used, the main control section 7 once terminates the calling operation at the modem section 2, and commands the communication control section 3 to once open the subscriber telephone line so as to discontinue the attempt to facsimile communication (step S8).

After the discontinuation of the facsimile communication, the main control section 7 subtracts one from the value being set in the first register (step S9), so as to indicate the remaining number of unattempted registered destination facsimile numbers. At the same time, the main control section 7 adds one to the count number N being set in the second register (step S10), so as to designate the second facsimile number in the corresponding block. Then as it is confirmed that the value in the first register is not zero (step S11), the presence of other facsimile numbers for the designated destination is also confirmed. Responsive to step 511, the main control section 7 reads out the second facsimile number (step S4), so as to call the destination by the second facsimile number (step S5).

A series of such operations are repeated until the value in the first register becomes zero, meaning that callings by the entire registered facsimile numbers of the designated destination have been attempted. As a response from the designated destination is confirmed in the course of such operations being repeated, facsimile transmission will be executed by the destination facsimile number to which the destination has responded.

In case when the line is busy at every corresponding destination facsimile number, and the value in the first register becomes zero to indicate that there are no more unattempted facsimile numbers, the main control section 7 repeats the operation starting from reading out the value indicating the total number of registered facsimile numbers in the corresponding block in the back-up memory 1, so as to set the value being read out again to the first register, and set "N=1" once again to the second register, in order to repeat the calling operation starting from the first facsimile number continuing to the second and the rest in numerical order.

Therefore, in accordance with the facsimile device of the present invention, it requires only a single one-touch key operation to set a condition where facsimile transmission can be directed to a designated destination using a plurality of facsimile numbers of the destination.

While the preferred embodiment of the invention has been described using specific terms, such description is for illustrative purposes only, and it is to be understood that changes and variations may be made without departing from the spirit or the scope of the following claims. For instance, the one-touch key(s) can be provided as a single key or as a number of keys.

What is claimed is:
1. A facsimile device comprising:
   a registration means for storing a plurality of destination facsimile numbers for a designated destination, each of which corresponds to a certain key among other arbitrary number of keys;
   a modem means for transmitting and receiving facsimile signals between a remote device in accordance with a facsimile communication procedure;
   a facsimile transceiver means for scanning loaded documents to transfer the scanned image information to the modem means, and for printing out and outputting image information which is being transferred from the modem means;
   a communication control means for controlling closing and opening of a subscriber telephone line; and
   a main control means for controlling the registration means to register thereto and read-out therefrom the destination facsimile numbers, and for performing control operations over the modem means, the communication control means, and the facsimile transceiver means, such that in response to a certain key being pressed at a time of facsimile communication, calling operation directed to a particular destination designated by the pressed key is executed by dialing a plurality of destination facsimile numbers, one at a time, in turn, so that an available destination facsimile number of a facsimile communication means of the designated destination is automatically selected, whereby facsimile communication directed to the designated destination is effected by the selected destination facsimile number, wherein
   the main control means is constructed in such a way that at a time of one-touch key registration, it controls the registration means to determine a location for a block corresponding to each key in order to store an address of each block in a designated region, and to store in each block a value indicating the number of the registered destination facsimile numbers as well as the registered destination facsimile numbers themselves of a particular destination; while at a time of one of the keys being pressed, it controls the facsimile transceiver means to immediately start scanning loaded documents so as to store the scanned image information, controls the registration means to read out registered destination facsimile numbers in a block designated by the pressed key in turn while also counting them, controls the modem means to call the designated destination by the registered destination facsimile numbers being read out, and controls the communication control means to close the subscriber telephone line and let the image information be transmitted from the facsimile transceiver means; and while at a time of terminating the facsimile communication or detect- ing busy tone signals from the modem means, it gives instruction to the communication control means to open the subscriber telephone line, wherein the opening of the subscriber telephone line in response to the instruction received by the communication control means occurs subsequent to and as a result of a pressing of a one-touch key, and wherein the pressing of a one-touch key causes the main control means to set a first register equal to the number of destination facsimile numbers and to set a second register equal to "1".

2. A facsimile device as claimed in claim 1, wherein:

the modem means is constructed in such a way that at a time of facsimile communication, it serves to execute transmission and reception of control signals between a remote device in accordance with a regulated facsimile communication procedure, detect busy tone signals indicating that the line is busy at a certain destination facsimile number, transmit facsimile image information signals to the destination, and receive facsimile image information signals from a remote device.

3. A facsimile device as claimed in claim 1, wherein:

the facsimile transceiver means effects bidirectional parallel data transmission between the modem means by digital data, such that at a time of facsimile transmission, image information obtained by scanning the loaded documents is transferred to the modem means, and at a time of facsimile reception, image information received from the modem means is printed and outputted.

4. A facsimile device as claimed in claim 1, wherein:

said keys are provided in such a way that upon any one of them being pressed, corresponding information is to be transmitted to the control means.

5. A facsimile device as claimed in claim 1, wherein:

the registration means includes regions for storing addresses of blocks each of which corresponds to a certain key, the registration means being constructed in such a way that each of said regions stores a value indicating a number of registered facsimile numbers of a particular destination corresponding to a certain key, and the registered facsimile numbers themselves.

6. A facsimile device as claimed in claim 5, wherein:

the facsimile transceiver means effects bidirectional parallel data transmission between the modem means by digital data, such that at a time of facsimile transmission, image information obtained by scanning the loaded documents is transferred to the modem means, and at a time of facsimile reception, image information received from the modem means is printed and outputted.

7. A facsimile device as claimed in claim 5, wherein:

the main control means is constructed in such a way that at a time of one-touch key registration, it controls the registration means to determine a location for a block corresponding to each key in order to store an address of each block in a designated region, and to store in each block a value indicating the number of the registered destination facsimile numbers as well as the registered destination facsimile numbers themselves of a particular destination; while at a time of one of the keys being pressed, it controls the facsimile transceiver means to immediately start scanning loaded documents so as to store the scanned image information, controls the registration means to read out registered destination facsimile numbers in a block designated by the pressed key in turn while also counting them, controls the modem means to call the designated destination by the registered destination facsimile numbers being read out, and controls the communication control means to close the subscriber telephone line and let the image information be transmitted from the facsimile transceiver means; and while at a time of terminating the facsimile communication or detecting busy tone signals from the modem means, it gives instruction to the communication control means to open the subscriber telephone line.

8. A facsimile device as claimed in claim 5, wherein:

said keys are provided in such a way that upon any one of them being pressed, corresponding information is to be transmitted to the control means.

9. A facsimile device as claimed in claim 5, wherein:

the modem means is constructed in such a way that at a time of facsimile communication, it serves to execute transmission and reception of control signals between a remote device in accordance with a regulated facsimile communication procedure, detect busy tone signals indicating that the line is busy at a certain destination facsimile number, transmit facsimile image information signals to the destination, and receive facsimile image information signals from a remote device.

10. A facsimile device as claimed in claim 9, wherein:

the main control means is constructed in such a way that at a time of one-touch key registration, it controls the registration means to determine a location for a block corresponding to each key in order to store an address of each block in a designated region, and to store in each block a value indicating the number of the registered destination facsimile numbers as well as the registered destination facsimile numbers themselves of a particular destination; while at a time of one of the keys being pressed, it controls the facsimile transceiver means to immediately start scanning loaded documents so as to store the scanned image information, controls the registration means to read out registered destination facsimile numbers in a block designated by the pressed key in turn while also counting them, controls the modem means to call the designated destination by the registered destination facsimile numbers being read out, and controls the communication control means to close the subscriber telephone line and let the image information be transmitted from the facsimile transceiver means; and while at a time of terminating the facsimile communication or detecting busy tone signals from the modem means, it gives instruction to the communication control means to open the subscriber telephone line.

11. A facsimile device as claimed in claim 9, wherein:

said keys are provided in such a way that upon any one of them being pressed, corresponding information is to be transmitted to the control means.

12. A facsimile device as claimed in claim 9, wherein:

the facsimile transceiver means effects bidirectional parallel data transmission between the modem means by digital data, such that at a time of facsimile transmission, image information obtained by scanning the loaded documents is transferred to the modem means, and at a time of facsimile reception, image information received from the modem means is printed and outputted.

13. A facsimile device as claimed in claim 12, wherein:

said keys are provided in such a way that upon any one of them being pressed, corresponding information is to be transmitted to the control means.

14. A facsimile device as claimed in claim 12, wherein:

the main control means is constructed in such a way that at a time of one-touch key registration, it controls the registration means to determine a location for a block corresponding to each key in order to store an address of each block in a designated region, and to store in each block a value indicating the number of the registered destination facsimile numbers as well as the registered destination facsimile numbers themselves of a particular destination; while at a time of one of the keys being pressed, it controls the facsimile transceiver means to immediately start scanning loaded documents so as to store the scanned image information, controls the registration means to read out registered destination facsimile numbers in a block designated by the pressed key in turn while also counting them, controls the modem means to call the designated destination by the registered destination facsimile numbers being read out, and controls the communication control means to close the subscriber telephone line and let the image information be transmitted from the facsimile transceiver means; and while at a time of terminating the facsimile communication or detecting busy tone signals the modem means, it gives instruction to the communication control means to open the subscriber telephone line.

15. A facsimile device as claimed in claim 14, wherein:

said keys are provided in such a way that upon any one of them being pressed, corresponding information is to be transmitted to the control means.

16. A facsimile device comprising:

a registration means for storing a plurality of destination facsimile numbers for a designated destination, each of which corresponds to a certain key among other arbitrary number of keys;

a modem means for transmitting and receiving facsimile signals between a remote device in accordance with a facsimile communication procedure;

a facsimile transceiver means for scanning loaded documents to transfer the scanned image information to the modem means, and for printing out and outputting image information which is being transferred from the modem means;

a communication control means for controlling closing and opening of a subscriber telephone line; and a main control means for controlling the registration means to register thereto and read-out therefrom the destination facsimile numbers, and for performing control operations over the modem means, the communication control means, and the facsimile transceiver means, such that in response to a certain key being pressed at a time of facsimile communication, calling operation directed to a particular destination designated by the pressed key is executed by dialing a plurality of destination facsimile numbers, one at a time, in turn, so that an available destination facsimile number of a facsimile communication means of the designated destination is automatically selected, whereby facsimile communication directed to the designated destination is effected by the selected destination facsimile number, wherein the registration means includes regions for storing addresses of blocks each of which corresponds to a certain key, the registration means being constructed in such a way that each of said regions stores a value indicating a number of registered facsimile numbers of a particular destination corresponding to a certain key, and the registered facsimile numbers themselves, and the main control means is constructed in such a way that at a time of one-touch key registration, it controls the registration means to determine a location for a block corresponding to each key in order to store an address of each block in a designated region, and to store in each block a value indicating the number of the registered destination facsimile numbers as well as the registered destination facsimile numbers themselves of a particular destination; while at a time of one of the keys being pressed, it controls the facsimile transceiver means to immediately start scanning loaded documents so as to store the scanned image information, controls the registration means to read out registered destination facsimile numbers in a block designated by the pressed key in turn while also counting them, controls the modem means to call the designated destination by the registered destination facsimile numbers being read out, and controls the communication control means to close the subscriber telephone line and let the image information be transmitted from the facsimile transceiver means; and while at a time of terminating the facsimile communication or detecting busy tone signals from the modem means, it gives instruction to the communication control means to open the subscriber telephone line, and wherein the opening of the subscriber telephone line in response to the instruction received by the communication control means occurs subsequent to and as a result of a pressing of a one-touch key, and wherein the pressing of a one-touch key causes the main control means to set a first register equal to the number of destination facsimile numbers and to set a second register equal to "1".

17. A facsimile device comprising:

a registration means for storing a plurality of destination facsimile numbers for a designated destination, each of which corresponds to a certain key among other arbitrary number of keys;

a modem means for transmitting and receiving facsimile signals between a remote device in accordance with a facsimile communication procedure;

a facsimile transceiver means for scanning loaded documents to transfer the scanned image information to the modem means, and for printing out and outputting image information which is being transferred from the modem means;

a communication control means for controlling closing and opening of a subscriber telephone line; and a main control means for controlling the registration means to register thereto and read-out therefrom the destination facsimile numbers, and for performing a control operations over the modem means, the communication control means, and the facsimile transceiver means, such that in response to a certain key being pressed at a time of facsimile communication, calling operation directed to a particular destination designated by the pressed key is executed by dialing a plurality of destination facsimile numbers, one at a time, in turn, so that an available destination facsimile number of a facsimile communication means of the designated destination is automatically selected, whereby facsimile communication directed to the designated destination is effected by the selected destination facsimile number, wherein the registration means includes regions for storing addresses of blocks each of which corresponds to a certain key, the registration means being constructed in such a way that each of said regions stores a value indicating a number of registered facsimile numbers of a particular destination corresponding to a certain key, and the registered facsimile numbers themselves, the modem means is constructed in such a way that at a time of facsimile communication, it serves to execute transmission and reception of control signals between a remote device in accordance with a regulated facsimile communication procedure, detect busy tone signals indicating that the line is busy at a certain destination facsimile number, transmit facsimile image information signals to the destination, and receive facsimile image information signals from a remote device, and the main control means is constructed in such a way that at a time of one-touch key registration, it controls the registration means to determine a location for a block corresponding to each key in order to store an address of each block in a designated region, and to store in each block a value indicating the number of the registered destination facsimile numbers as well as the registered destination facsimile numbers themselves of a particular destination; while at a time of one of the keys being pressed, it controls the facsimile transceiver means to immediately start scanning loaded documents so as to store the scanned image information, controls the registration means to read out registered destination facsimile numbers in a block designated by the pressed key in turn while also counting them, controls the modem means to call the designated destination by the registered destination facsimile numbers being read out, and controls the communication control means to close the subscriber telephone line and let the image information be transmitted from the facsimile transceiver means; and while at a time of terminating the facsimile communication or detecting busy tone signals from the modem means, it gives instruction to the communication control means to open the subscriber telephone line, and wherein the opening of the subscriber telephone line in response to the instruction received by the communication control means occurs subsequent to and as a result of a pressing of a one-touch key, and wherein the pressing of a one-touch key causes the main control means to set a first register equal to the number of destination facsimile numbers and to set a second register equal to "1".

18. A facsimile device comprising:

a registration means for storing a plurality of destination facsimile numbers for a designated destination, each of which corresponds to a certain key among other arbitrary number of keys;

a modem means for transmitting and receiving facsimile signals between a remote device in accordance with a facsimile communication procedure;

a facsimile transceiver means for scanning loaded documents to transfer the scanned image information to the modem means, and for printing out and outputting image information which is being transferred from the modem means;

a communication control means for controlling closing and opening of a subscriber telephone line; and a main control means for controlling the registration means to register thereto and read-out therefrom the destination facsimile numbers, and for performing control operations over the modem means, the communication control means, and the facsimile transceiver means, such that in response to a certain key being pressed at a time of facsimile communication, calling operation directed to a particular destination designated by the pressed key is executed by dialing a plurality of destination facsimile numbers, one at a time, in turn, so that an available destination facsimile number of a facsimile communication means of the designated destination is automatically selected, whereby facsimile communication directed to the designated destination is effected by the selected destination facsimile number, wherein the registration means includes regions for storing addresses of blocks each of which corresponds to a certain key, the registration means being constructed in such a way that each of said regions stores a value indicating a number of registered facsimile numbers of a particular destination corresponding to a certain key, and the registered facsimile numbers themselves, the modem means is constructed in such a way that at a time of facsimile communication, it serves to execute transmission and reception of control signals between a remote device in accordance with a regulated facsimile communication procedure, detect busy tone signals indicating that the line is busy at a certain destination facsimile number, transmit facsimile image information signals to the destination, and receive facsimile image information signals from a remote device, the facsimile transceiver means effects bidirectional parallel data transmission between the modem means by digital data, such that at a time of facsimile transmission, image information obtained by scanning the loaded documents is transferred to the modem means, and at a time of facsimile reception, image information received from the modem means is printed and outputted, and the main control means is constructed in such a way that at a time of one-touch key registration, it controls the registration means to determine a location for a block corresponding to each key in order to store an address of each block in a designated region, and to store in each block a value indicating the number of the registered destination facsimile numbers as well as the registered destination facsimile numbers themselves of a particular destination; while at a time of one of the keys being pressed, it controls the facsimile transceiver means to immediately start scanning loaded documents so as to store the scanned image information, controls the registration means to read out registered destination facsimile numbers in a block designated by the pressed key in turn while also counting them, controls the modem means to call the designated destination by the registered destination facsimile numbers being read out, and controls the communication control means to close the subscriber telephone line and let the image information be transmitted from the facsimile transceiver means; and while at a time of terminating the facsimile communication or detecting busy tone signals the modem means, it gives instruction to the communication control means to open the subscriber telephone line, and wherein the opening of the subscriber telephone line in response to the instruction received by the communication control means occurs subsequent to and as a result of a pressing of a one-touch key, and wherein the pressing of a one-touch key causes the main control means to set a first register equal to the number of destination facsimile numbers and to set a second register equal to "1".

19. A facsimile device as claimed in claim 18, wherein:

said keys are provided in such a way that upon any one of them being pressed, corresponding information is to be transmitted to the control means.

* * * * *